June 10, 1930. R. B. RATHBUN 1,763,010
ELECTROSTATIC PRECIPITATOR
Filed Aug. 12, 1926   3 Sheets-Sheet 3

INVENTOR
Ross Buxton Rathbun
BY Albert M. Austin
ATTORNEY

Patented June 10, 1930

1,763,010

UNITED STATES PATENT OFFICE

ROSS BUXTON RATHBUN, OF EL PASO, TEXAS, ASSIGNOR TO AMERICAN SMELTING AND REFINING COMPANY, OF NEW YORK, N. Y., A CORPORATION OF NEW JERSEY

ELECTROSTATIC PRECIPITATOR

Application filed August 12, 1926. Serial No. 128,781.

The invention relates to an improvement in the art of precipitating solids suspended in moving gaseous streams, in which art the gaseous streams are passed through electrostatic fields, and more particularly, to a novel apparatus including new forms of electrodes for creating the electrostatic field. These devices are usually known in the art as electrostatic precipitators.

According to the invention a flue or conduit through which may pass a gas carrying solid particles which are to be precipitated, may be provided with a plurality of pairs of oppositely charged electrodes at high direct tension. One electrode of each pair of electrodes may be in the form of a cylinder of quite open mesh so as not to impede too greatly the flow of gases therethrough. The other electrode of each pair may comprise a single wire concentrically arranged in the cylinder. The arrangement of electrodes is such that the flow of gas is substantially at right angles to the axes of the electrodes, the open mesh character of the cylindrical electrodes offering practically no impedance to the flow of gas in the conduit. Furthermore, the arrangement of concentric electrodes serves to create an electrostatic field having directions both perpendicular and parallel to the direction of gas flow through the conduit.

The construction of the cylindrical electrode also offers the advantage that it may be made of great height or length and may be rigidly mounted, and yet may be resilient enough so that, when it is struck by a blow with a hammer at the top thereof, the vibrations will travel to the bottom with as little diminution as possible and the entire amount of collected solids may be discharged. The relatively great height gives rise to the advantage that the necessary cross section of flue may be obtained with a relatively small lateral dimension, thereby resulting in a great saving of floor space or ground area. The saving in ground area furthermore results in cheaper construction of the hoppers provided at the bottom to catch the solids, and results in saving in trackage for carrying the cars to the hoppers.

Various other objects and advantages of the invention will be obvious from the following particular description of one form of mechanism embodying the invention or from an inspection of the accompanying drawings; and the invention also consists in certain new and novel features of construction and combinations of parts hereinafter set forth and claimed.

Figure 1:
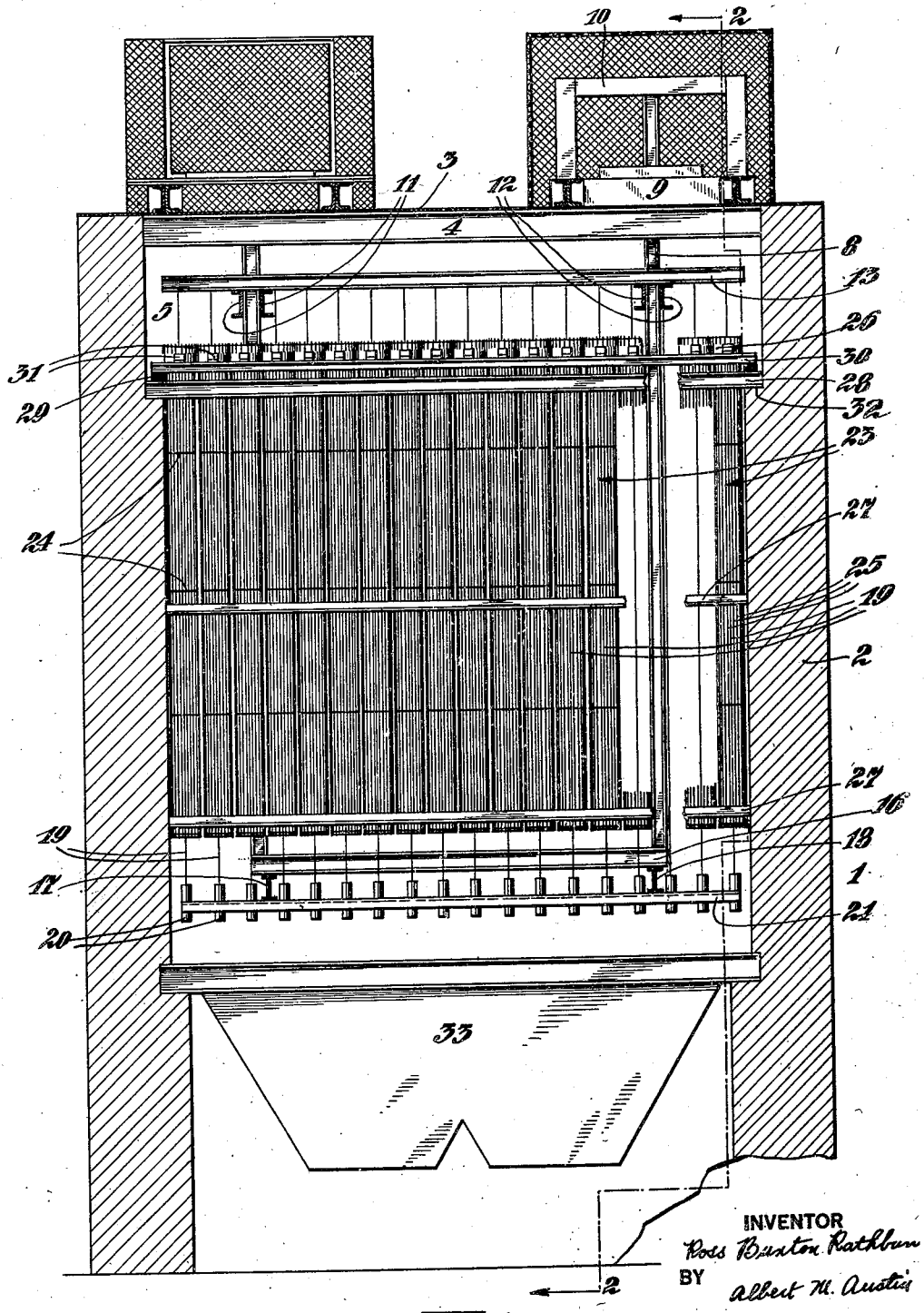
Fig. 1 is a vertical transverse cross section of a horizontal flue provided with an electrode arrangement according to the invention taken on the line 1—1 of Fig. 2.
Figure 2:
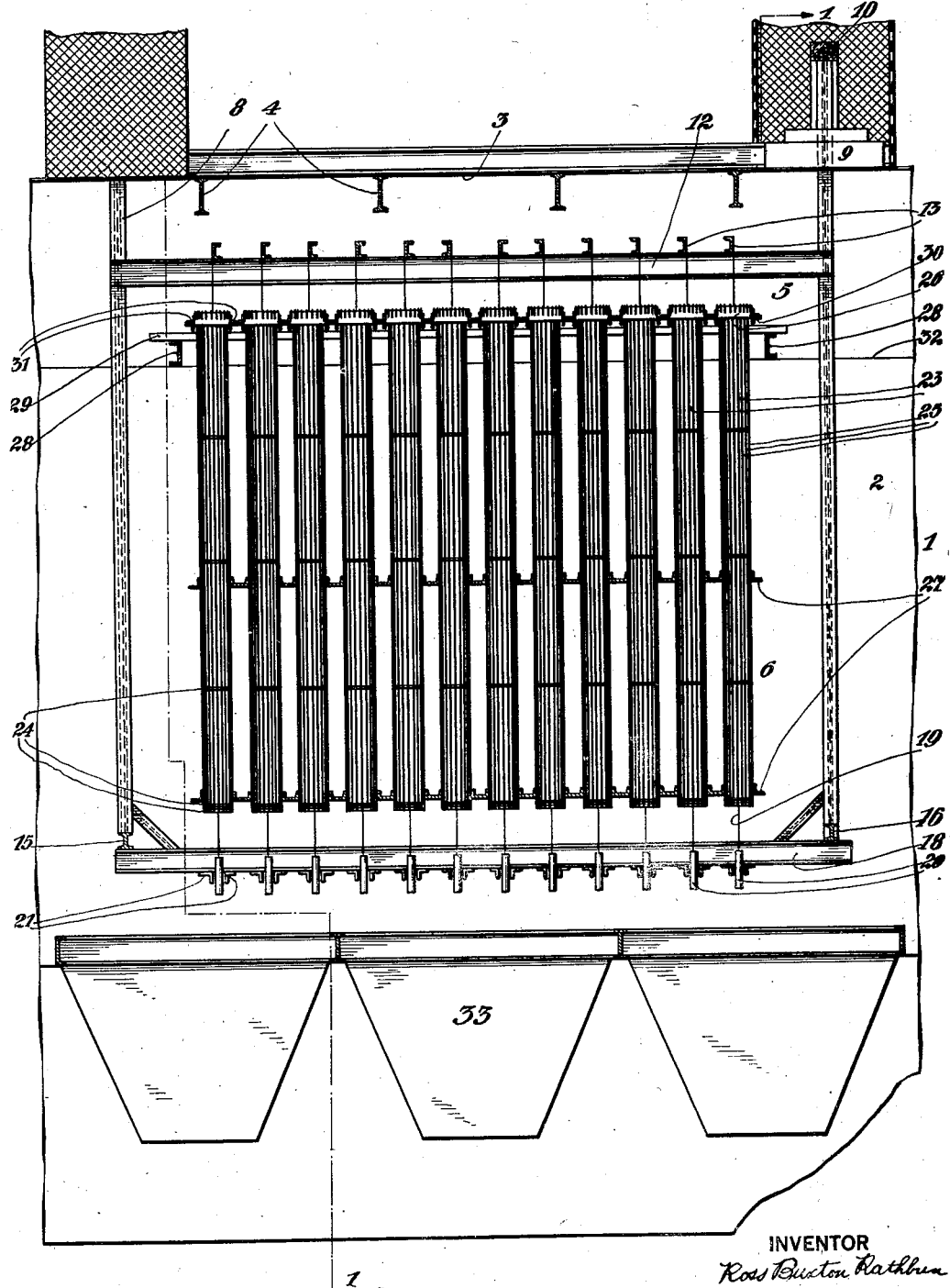
Fig. 2 is a longitudinal vertical cross section of the same flue taken on the line 2—2 of Fig. 1.

In the following description and in the claims parts will be identified by specific names for convenience, but they are intended to be as generic in their application to similar parts as the art will permit.

Referring now to the drawing, the flue 1 may comprise vertical side walls 2 of masonry or other suitable material and a roof 3 suitably supported on the side walls, as by beams 4, all parts being made of suitable material to withstand the flue temperature.

An electrode arrangement is shown for purposes of illustration comprising a single discharge electrode assembly 5 and a single collecting electrode assembly 6, making up a single assembly pair. It will be understood, however, that the electrode arrangement may comprise, if necessary or desirable, a plurality of both discharge and collecting assemblies making up a plurality of assembly pairs to obtain the desired effect.

A single discharge electrode assembly 5 will first be described. Depending from the roof 3 may be a framework made up of four rectangularly disposed depending members 8. The upper ends of the depending members 8 project through openings in the roof, the openings being sealed by means of suitable seals such as lime seals 9 which effectively prevent escape of the flue gases and yet keep the framework insulated from the flue. The upper end of the depending members may be supported by suitable insulator devices 10 resting upon the roof 3 as shown. Longitudinally extending upper beam pairs 11 and 12 may be provided to connect pairs of depending members 3. Upper cross beams 13 may be provided to rest upon the longitudinal beams 11 and 12. Lower cross beams 15 and 16 may be provided to connect the depending members 8 at their lower ends, and lower longitudinal beams 17 and 18 may be connected to the lower cross beams 15 and 16.

A plurality of spaced electrodes in the form of wires 19 may be suspended from the upper cross beams in rows as shown, each electrode having a weight 20 at its lower end. Guide devices 21 may be provided on the lower longitudinal beams 17 and 18 for guiding said weights and keeping them from swinging. The entire discharge assembly is at the same potential, is preferably charged negatively to form a discharge electrode, and is insulated from the flue 1.

Figures 4, 5:
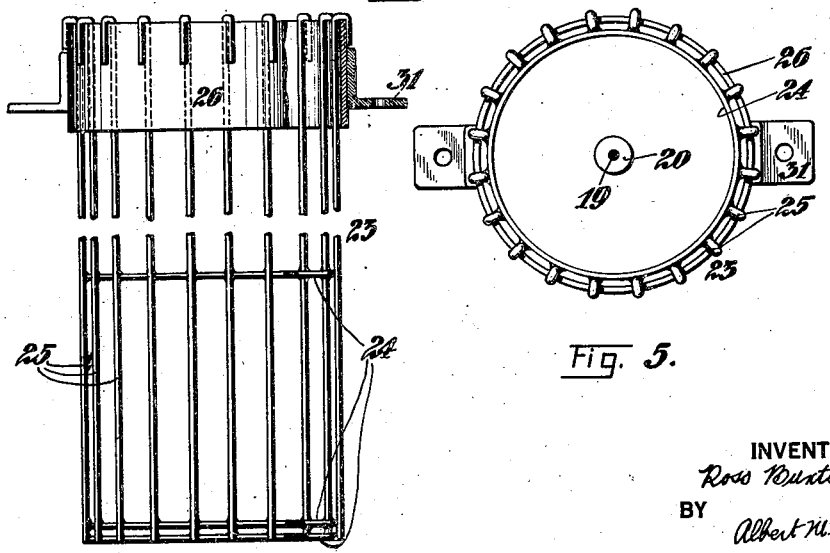
Fig. 4 is an elevation showing a detail construction of the positive collecting cylindrical electrode, the middle part being broken away to conserve space on the drawing.
Fig. 5 is a top view of Fig. 4 with the negative electrode in operating position.

The collecting electrode assembly will now be described. A plurality of wire cylinders 23 of open mesh may be provided, one surrounding each discharge electrode wire 19. Each of these cylinders 23 may be made substantially as shown in Figs. 4 and 5, and may comprise a series of lower rings 24 and an upper ring 26, spaced axially, and longitudinal elements 25 secured to said rings by welding or in any other desired manner. The upper ring 26 may be wider than the rest, and the longitudinal elements 25 may extend through the inside of the ring 26 to be bent over its upper edge to the outside thereof. Suitable lower cross members 27 may be provided connecting each row of cylinders 23 together and to the next row. Suitable upper cross members 30 may be provided connecting each row of cylinders together and to the next row by the angle irons 31 secured to the upper rings 26 of the cylinder electrodes.

The side walls 2 of the flue may have longitudinally extending ledges 32 on which may be supported a pair of transverse beams 28. Supported by said pair of transverse beams 28 near the ends thereof may be longitudinally extending members 29 which in turn may support the upper cross members 30. Thus the weight of the cylinders 23 is transferred to the walls 2 through the angle irons 31 and upper cross members 30. The entire cylinder or collecting assembly may be substantially at ground potential and consequently is not insulated therefrom. The cylinder electrodes may be charged positively and may constitute the collecting electrodes.

The present invention provides a structure in which the electrostatic discharge occurs both at right angles and parallel to the direction of the flow of the gas. Furthermore, the entire 360 degrees around the discharge electrodes 19 is under electrostatic stress, thereby making use of the entire circumference. The particles of solids will be ionized by the electrostatic field and will be attracted both to the negative collecting electrodes 23 and to the positive discharge electrodes 19. However, most of the particles will be attracted to the negative collecting electrodes 23.

When it is desired to clean the electrodes, the negative discharge electrodes may be cleaned by lifting the weights 20 slightly and letting them drop, causing the electrode wires to vibrate to effectively shake off the collected particles. The positive collecting electrodes 23 may be cleaned by striking the electrodes sharp blows, as by a hammer, to cause vibrations to travel axially to effectively shake off the collected particles. It will be understood that the solid matter collects in the hoppers 33 at the bottom of the flue and is removed in any desired manner.

It will be understood that a number of electrode assembly pairs may be used in series so that the gases must travel through all of them. The perforated or open mesh construction of the cylinder electrodes interposes but small impedance to the gas flow and absorbs but a small amount of heat, so that the draft is impaired to a minimum degree. All of the gas in passing serially through the several electrode pairs must pass somewhere through parts of the electrostatic field where the voltage gradient is sufficiently high for its ionization.

Furthermore, due to the open mesh and resilient construction of the cylinder electrode vibrations travel with little diminution the entire length thereof allowing the precipitate to be shaken off very readily by a blow at one end of the cylinder.

Figure 3:
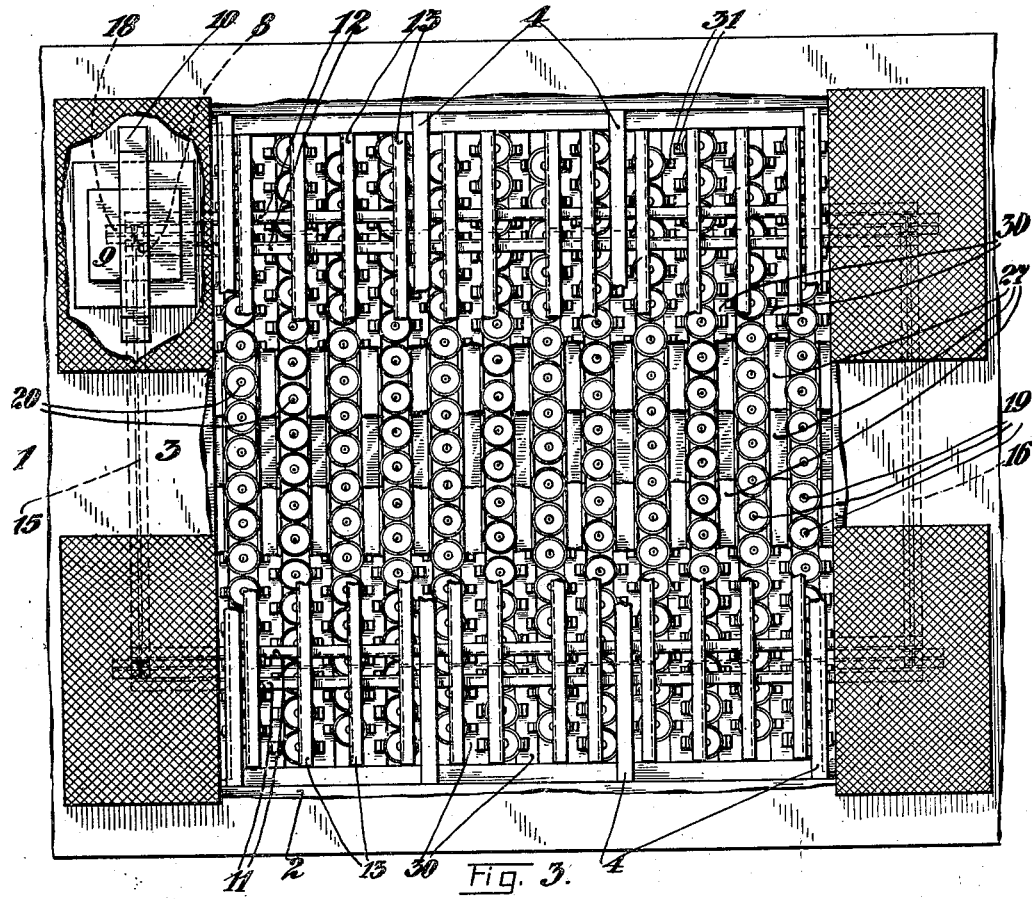
Fig. 3 is a top plan view of the flue with parts broken away.

As shown in Figure 3 a staggered arrangement of electrodes may be employed in order to avoid longitudinally open spaces and to insure that all gases must pass through one or more cylinders.

While I have shown and described and have pointed out in the annexed claims certain novel features of the invention, it will be understood that various omissions, substitutions and changes in the forms and details of the device illustrated and in its operation may be made by those skilled in the art without departing from the spirit of the invention.

Having thus described my invention, I claim:

1. In an electrostatic precipitator, a conduit, an electrode assembly comprising a plurality of first electrodes, a second electrode assembly comprising a plurality of electrode cylinders of open mesh, one surrounding each first electrode, means for insulating one of said assemblies from said conduit, and means for supporting said other assembly, said cylinders having their lengths disposed transverse to the length of said conduit.

2. In an electrostatic precipitator, a gas conduit, an electrode assembly comprising a framework, insulator devices on the roof of said conduit supporting said framework, a plurality of first electrodes supported by said framework, a second electrode assembly comprising a plurality of electrode cylinders of open mesh, one surrounding each first electrode, and a framework for supporting said electrode cylinders in said conduit, said cylinders having their lengths disposed transverse to the length of said conduit.

3. In an electrostatic precipitator, a horizontally disposed gas conduit, an electrode assembly comprising a framework including depending members, upper beams and lower guide devices, insulator devices on the roof of said conduit supporting said depending members, a plurality of wire electrodes suspended from said upper cross beams, each having a weight at its lower end guided by said guide devices, a second electrode assembly comprising a plurality of wire electrode cylinders of open mesh, one surrounding each wire electrode, connecting members between the rows of cylinders connecting adjoining rows, and means for supporting the upper connecting members in said conduit.

4. In an electrostatic precipitator, a horizontally disposed gas conduit, an electrode assembly comprising a framework including depending members, upper cross beams extending across said conduit, and lower guide devices, insulator devices on the roof of said conduit supporting said depending members, a plurality of wire electrodes suspended in rows from said upper cross beams, each having a weight at its lower end guided by said guide devices, a second electrode assembly comprising a plurality of wire electrode cylinders of open mesh, one surrounding each wire electrode, cross members extending across said conduit, between the rows of cylinders connecting adjoining rows, the walls of said conduit having ledges, and means for supporting the upper cross members on said ledges.

5. In an electrostatic precipitator, a conduit, an elongated cylindrical electrode of open mesh construction, an electrode cooperating with said cylindrical electrode, and means for mounting said electrodes in said conduit with their axes transverse to the length of said conduit, said cylindrical electrode being supported at its upper end only.

6. In an electrostatic precipitator, a longitudinally extending conduit, an elongated cylindrical electrode of open mesh, wire construction, a long electrode wire within said cylindrical electrode, and means for mounting said electrodes in said conduit with their axes transverse to the length of said conduit, whereby the material flowing thru said conduit passes completely thru said cylindrical electrode transversely of the axis thereof.

7. In an electrostatic precipitator, a longitudinally extending conduit, a cylindrical electrode of open mesh construction, an electrode within said cylindrical electrode, and means for mounting said electrodes in said conduit with their axes transverse to the length thereof.

8. In an electrostatic precipitator, a conduit, oppositely charged electrodes, arranged so that said electrodes create an electrostatic field within said conduit and having directions both perpendicular and parallel to the direction of flow of material through said conduit.

9. In an electrostatic precipitator, a gas flue, an electrode assembly comprising a plurality of electrodes at a given potential, a second electrode assembly comprising a plurality of electrodes at a second given potential, said electrodes being arranged so that electrostatic fields are created in said flue and having directions both perpendicular and parallel to the direction of gas flow through said flue.

In testimony whereof I have hereunto set my hand.

ROSS BUXTON RATHBUN.